United States Patent [19]
Ohta et al.

[11] Patent Number: 5,666,460
[45] Date of Patent: Sep. 9, 1997

[54] COMPRESSED PICTURE INFORMATION RECORDING APPARATUS PERFORMING IN REAL TIME

[75] Inventors: Minemasa Ohta; Naoto Itoh, both of Yamanashi, Japan

[73] Assignees: Pioneer Video Corporation, Yamanashi; Pioneer Electronic Corporation, Tokyo, both of Japan

[21] Appl. No.: 490,357

[22] Filed: Jun. 14, 1995

[30] Foreign Application Priority Data

Jun. 20, 1994 [JP] Japan .................................. 6-137460

[51] Int. Cl.$^6$ .................................................. H04N 5/781
[52] U.S. Cl. ............................. 386/82; 386/125; 386/111; 386/112
[58] Field of Search ................................. 358/335, 342, 358/312, 337; 360/33.1, 10.1; 369/60; 386/46, 80, 81, 87, 91, 124, 125, 82, 86, 111, 112, 15; H04N 5/781

[56] References Cited

U.S. PATENT DOCUMENTS

| | | | |
|---|---|---|---|
| 4,872,073 | 10/1989 | Fincher et al. | 360/51 |
| 4,985,784 | 1/1991 | Tsuboi et al. | 358/342 |
| 5,432,769 | 7/1995 | Honjo | 369/60 |

*Primary Examiner*—Thai Tran
*Assistant Examiner*—Huy Nguyen
*Attorney, Agent, or Firm*—Fish & Richardson

[57] ABSTRACT

A compressed picture information recording apparatus which sequentially stores modulated compressed video signals in a memory, and reads information from the memory in such a way as to reduce the information reading speed when the remaining memory space becomes smaller than a predetermined value and to increase the information reading speed when the remaining memory space becomes greater than the predetermined value. This apparatus records the read information on a recording disk at a recording linear velocity according to the information reading speed. This structure permits compressed video signals excluding invalid data to be continuously recorded on the recording disk at a variable transfer rate according to the producing rate of the compressed video signals, thus ensuring a high recording efficiency.

3 Claims, 9 Drawing Sheets

COMPRESSED PICTURE INFORMATION RECORDING APPARATUS PERFORMING IN REAL TIME

BACKGROUND OF THE INVENTION

1. Field of the Invention

The present invention relates to a compressed picture information recording apparatus for recording compressed picture information on a recording disk.

2. Description of the Related Art

Figure 1:
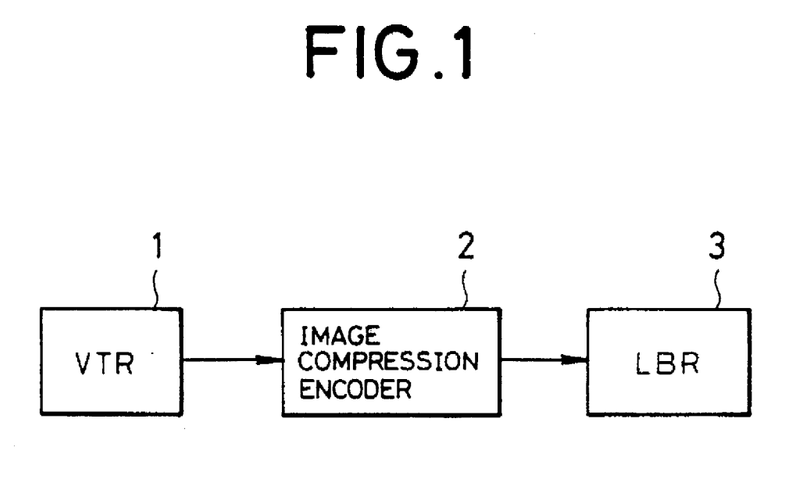
FIG. 1 is a diagram illustrating the structure of a compressed picture information recording apparatus.

FIG. 1 shows the structure of a recording apparatus for subjecting a video signal, reproduced by a VTR (Video Tape Recorder), to image compression and then recording the compressed video signal on a recording disk.

In FIG. 1, digital video signals reproduced by a VTR 1 are supplied to an image compression encoder 2. The image compression encoder 2 performs compression coding on such digital video signals, yielding compressed video signals, and converts the compressed video signals to have the proper recording format. The image compression encoder 2 then supplies the resultant video signals to an LBR (Laser Beam Recorder) 3. The LBR 3 sequentially records the format-changed compressed video signals on the recording disk.

The data recording rate, R0, of such a recording disk is constant. Therefore, the image compression encoder 2 carries out the compression coding on the minimum condition that the producing rate, R1, of the compressed video signals obtained in the compression coding does not exceed the recording rate R0 and in such a way that the producing rate R1 sufficiently approaches the recording rate R0.

At this time, the producing rate of compressed video signals, which are obtained based on video signals with a relatively complex image quality in the image compression encoder 2, is greater than the producing rate of compressed video signals, which are obtained based on video signals with a simple image quality. Consequently, the producing rate R1 generally varies in the range of several tens to 100% with respect to the recording rate R0.

Figure 2:
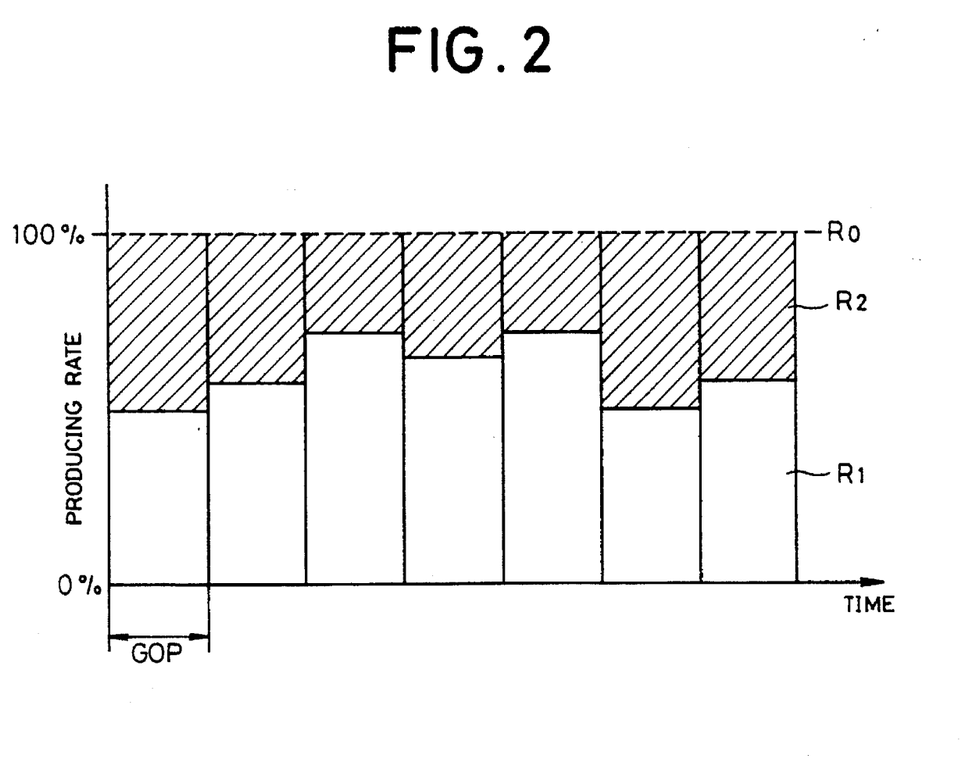
FIG. 2 is a diagram exemplifying the producing rate R1 of compressed video signals and the recording rate R0 of a recording disk.

The image compression encoder 2 is demanded to perform effectively compressing data with as small variation of the producing rate R1 as possible, and to affix invalid data to the produced data as shown in FIG. 2 with respect to the producing rate that varies at last, establishing the following condition.

Producing rate R1+Invalid rate R2=Recording rate R0

As a result, the variable producing rate is forcibly set to a constant rate (equivalent to the recording rate R0) so that both rates match with each other.

GOP (Group of Pictures) in FIG. 2 is a processing unit in the compression coding of video signals as specified by the ISO 11172 MPEG (Motion Picture Coding Experts Group) system.

With the use of a recording disk whose recording rate R0 is constant, even when the producing rate of the compressed video signals obtained by the image compression encoder is relatively small, data irrelevant to the picture to be recorded is also recorded at the time of recording. The recording efficiency is therefore deteriorated.

SUMMARY OF THE INVENTION

Accordingly, it is a primary objective of the present invention to provide a compressed picture information recording apparatus capable of recording a compressed video signal on a recording disk at a high recording efficiency.

A compressed picture information recording apparatus according to the present invention for performing digital compression coding on a video signal and recording the coded video signal on a recording disk, continuously in real time, which apparatus comprises an image compression encoder sequentially outputting a modulated compressed video signal obtained by compressing and modulating the video signal; a memory; write/read means for sequentially storing the modulated compressed video signal in the memory and reading the modulated compressed video signal from the memory in a storing order in accordance with a read clock signal; recording means for recording the modulated compressed video signal, read from the memory, on the recording disk; residual data amount detecting means for detecting an amount of residual data in the memory; and a controller for reducing a frequency of the read clock signal when the amount of residual data is smaller than a predetermined value, increasing the frequency of the read clock signal when the amount of residual data is greater than the predetermined value, and adjusting a recording linear velocity of the recording means in accordance with adjustment of the frequency of the read clock signal.

The compressed picture information recording apparatus according to this invention first sequentially stores modulated compressed video signals, obtained by compressing and modulating video signals, in the memory. This apparatus reads information from the memory in such a way as to reduce the information reading speed when the remaining memory space becomes smaller than a predetermined value and to increase the information reading speed when the remaining memory space becomes greater than the predetermined value. Then, this apparatus records the read signals on the recording disk at a recording linear velocity according to the information reading speed.

DETAILED DESCRIPTION OF THE PREFERRED EMBODIMENT

A preferred embodiment of the present invention will now be described referring to the accompanying drawings.

Figure 3:
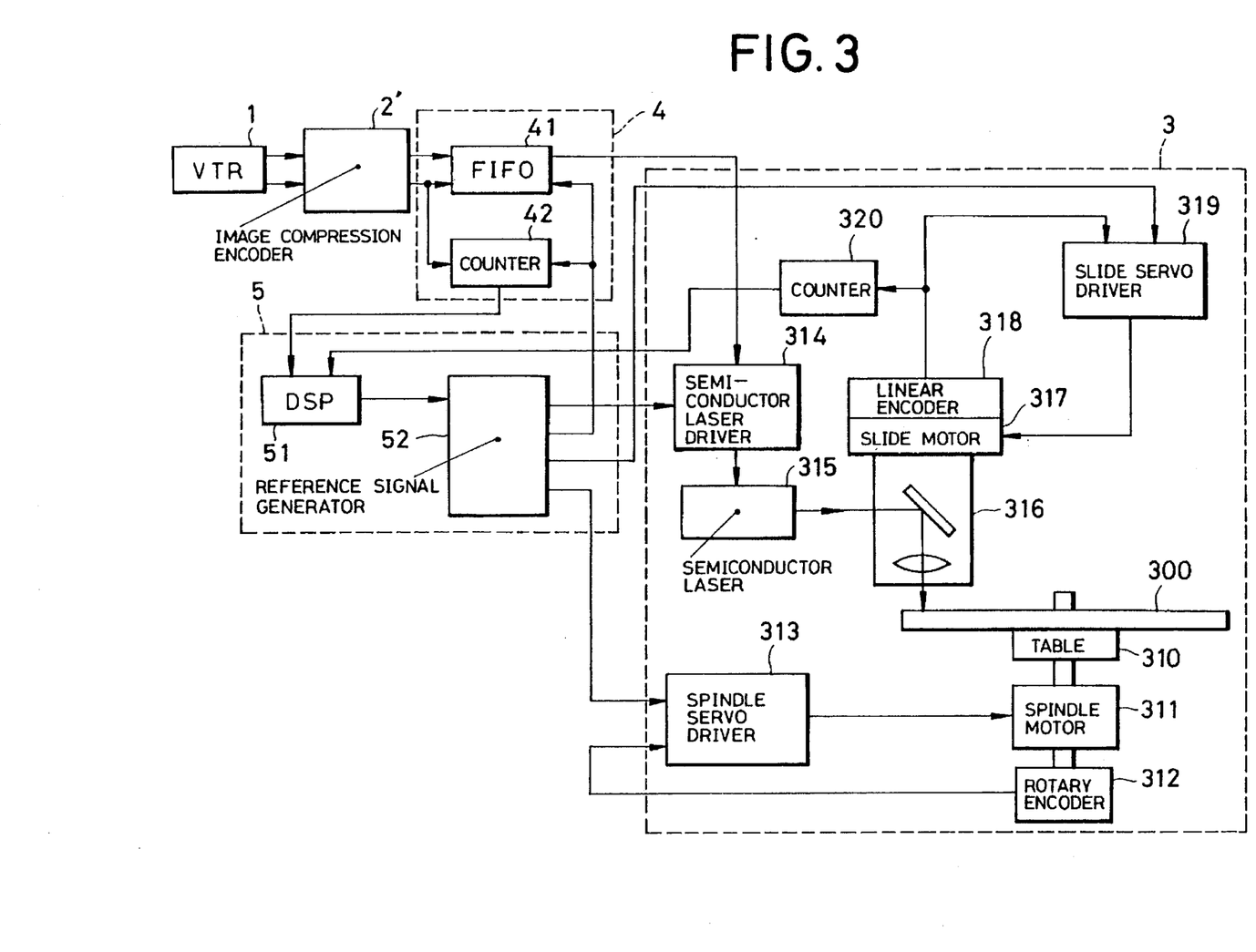
FIG. 3 is a diagram showing the structure of a compressed picture information recording apparatus embodying this invention.

FIG. 3 shows the structure of a compressed picture information recording apparatus according to this invention.

In FIG. 3, digital video signals reproduced by a VTR 1 are supplied to an image compression encoder 2'. The digital video signals conform to the 525/60 NTSC system.

Figure 4:
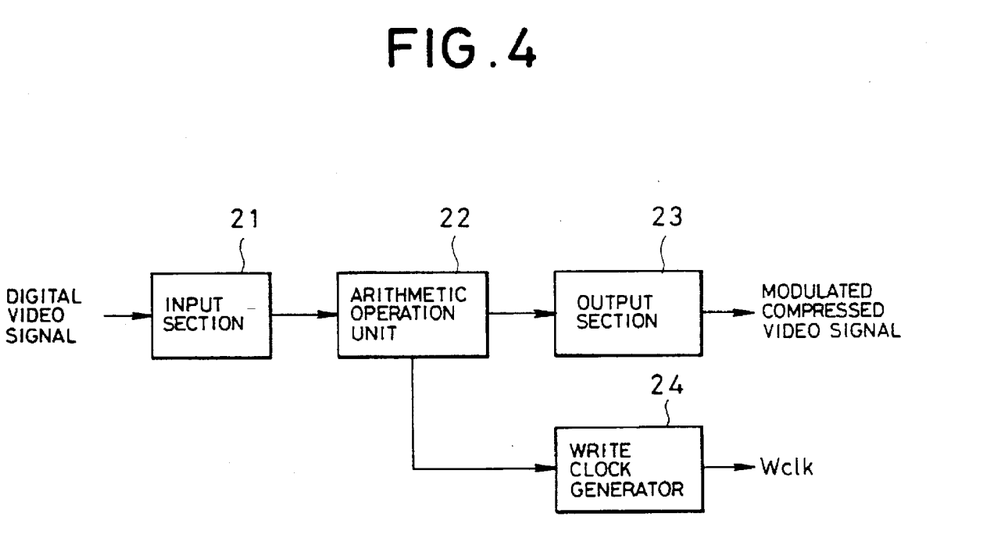
FIG. 4 is a diagram showing the structure of a image compression encoder 2'.

FIG. 4 Shows the internal structure of the image compression encoder 2'.

In FIG. 4, an input section 21 receives the digital video signals, reproduced by the VTR 1, GOP by GOP, e.g., 15 frames per GOP, and supplies the video signals to an arithmetic operation unit 22 at a delay time equivalent to one GOP.

Figure 5A:
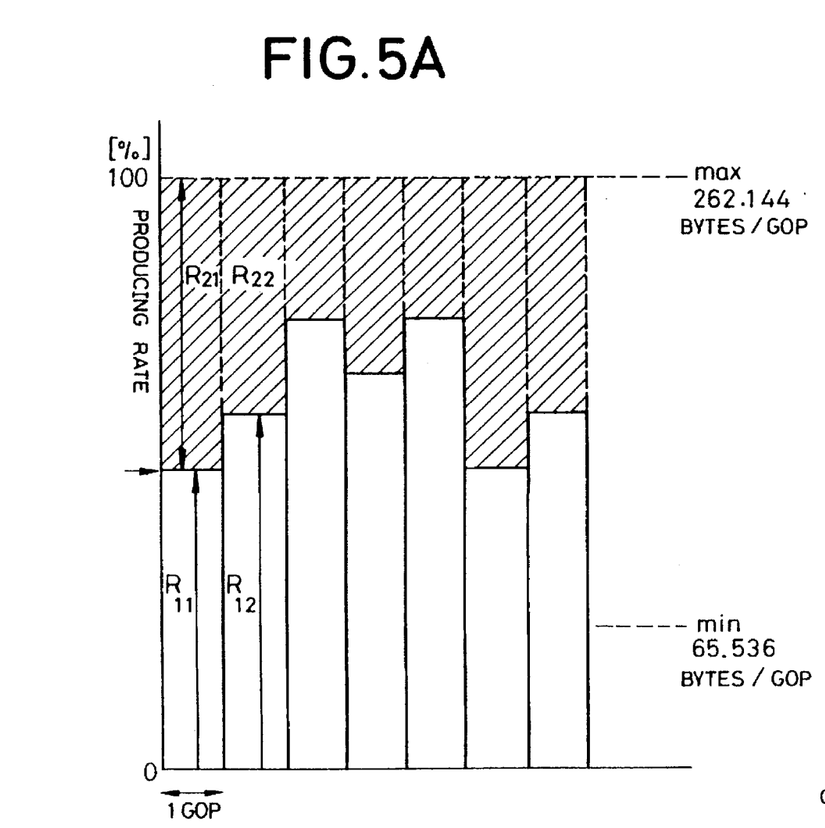
FIGS. 5A to 5C are diagrams for explaining the output operation of the image compression encoder 2'.
Figures 5B, 5C:
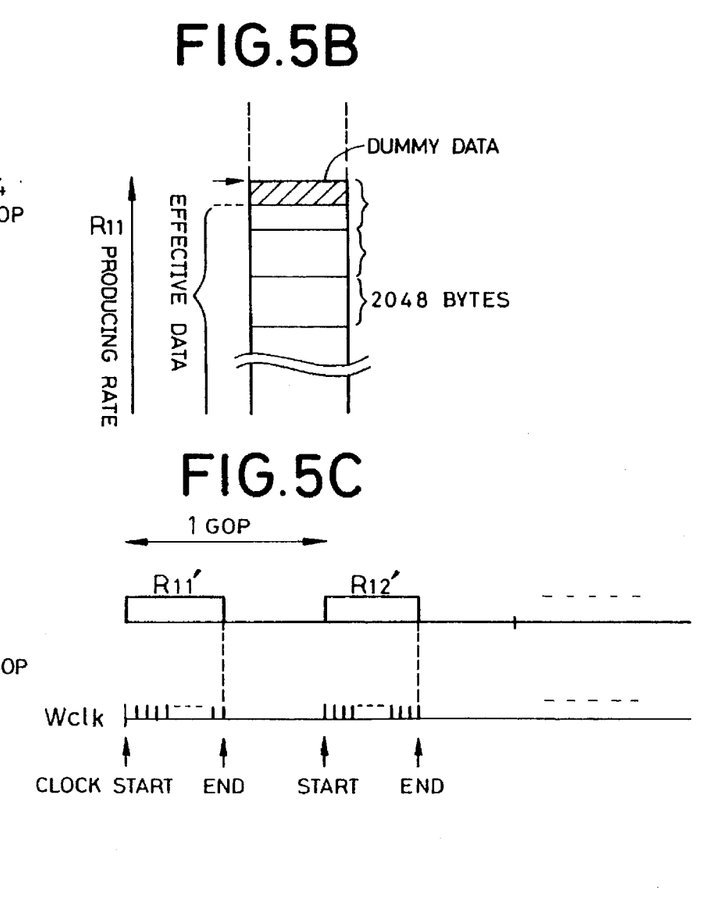

The arithmetic operation unit 22 performs compression coding on the digital video signals, reproduced by the VTR 1, in accordance with, for example, the ISO 11172 MPEG system, yielding compressed video signals. At this time, the arithmetic operation unit 22 changes the producing rate within the range of the minimum of 65,536 Kbytes/sec with 262,144 Kbytes/GOP as the maximum producing rate, as shown in FIG. 5A. Dummy data is automatically affixed to the produced compressed video signals as shown in FIG. 5B so that the output unit becomes a predetermined number of bytes, e.g., 2048 bytes, in one GOP. This is because that the logical conversion and physical conversion thereafter are performed in the units of 2048 bytes, so that it is convenient to set the length of the produced compressed video signal to an integer multiple of 2048 bytes. It is assumed that the unit of the variable rate in the arithmetic operation unit 22 is one GOP (=0.5 sec).

Next, the arithmetic operation unit 22 executes logical conversion and physical conversion on the compressed video signals. The physical conversion converts the compressed video signals to have a recording format. In combining video data, audio data and other data and then recording the resultant data, the logical conversion adds logical addresses, headers and so forth in accordance with their formats. To record the compressed video signals on a recording disk, the arithmetic operation unit 22 adds an error detection code and an error correction code to the compressed video signals after the format conversion and then performs modulation for recording, yielding modulated compressed video signals. The arithmetic operation unit 22 sends the modulated compressed video signals to an output section 23 and supplies producing rate information per GOP or information indicative of the total number of data in the modulated compressed video signals to a write clock generator 24. This modulation may be the EFM (Eight to Fourteen Modulation) for a CD. According to the MPEG system, video data is input in the form of a component signal, so that a D1 format VTR is to be used as the VTR 1. The use of a D2 format VTR requires a D1D2 converter for the format conversion before the arithmetic operation unit 22. Through the operation executed by the arithmetic operation unit 22, the amount of the resultant data becomes greater than the original data. It is assumed here that 2048 bytes (original data) become 4096 bytes.

The output section 23 supplies the received modulated compressed video signals to a FIFO 41 in a recording rate adjuster 4 as shown in FIG. 3. A write clock generator 24 generates a write clock signal Wclk of a given period (e.g., 1.048576 MHz), and supplies it to the FIFO 41 and a counter 42. At this time, the write clock generator 24 supplies write clocks corresponding in quantity to the number of total data in the modulated compressed video signals for each GOP, as shown in FIG. 5C. The supply of the write clock signal Wclk is controlled on the basis of the aforementioned producing rate information. Therefore, the modulated compressed video signals corresponding to the produced compressed video signals are sequentially supplied to the FIFO 41, GOP by GOP, and are written there until no modulated compressed video signal remains. When the writing of the modulated compressed video signals in one GOP is completed, the supply of the write clock is stopped. Therefore, no modulated compressed video signal corresponding to invalid data (shaded portion) as shown in FIG. 5A is stored in the FIFO 41.

Figure 6:
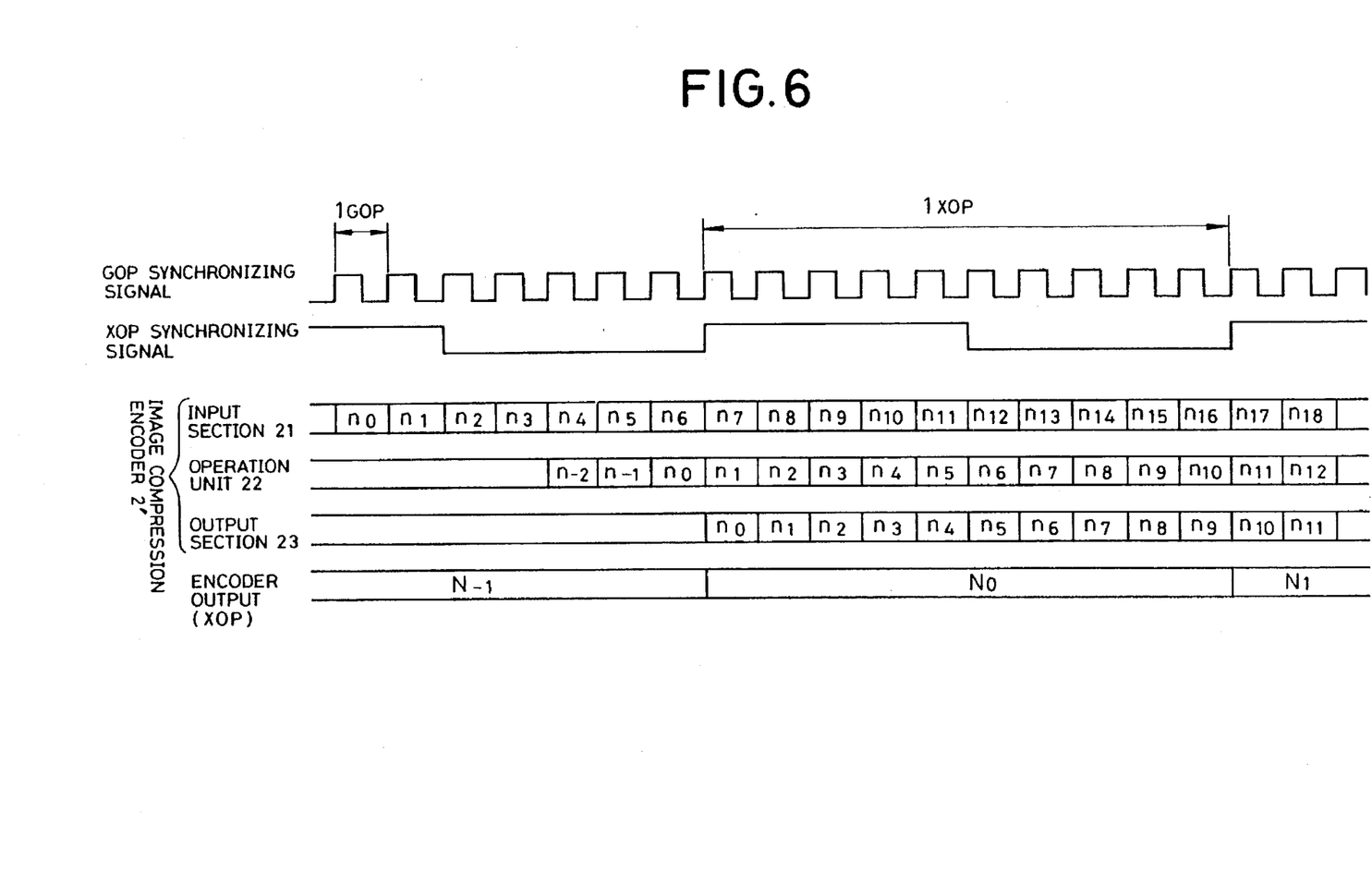
FIG. 6 is a diagram showing the operational timing of the image compression encoder 2'.

FIG. 6 shows the operation timing of the above-described image compression encoder 2'.

In FIG. 6, a GOP synchronizing signal has a period of one GOP (15 frames), and an XOP synchronizing signal has a length ten times that of the GOP synchronizing signal. The period of the XOP synchronizing signal represents the 5-sec control cycle of the recording linear velocity. Since video signals are input in real time by the VTR 1, the signal input to the input section 21 in the image compression encoder 2' should always be made in real time, and is thus continuous. As illustrated, a delay of six GOP's occurs in the arithmetic operation unit 22. Since the amount of video information is compressed by a factor of several tens during compression, the output section 23 has only to output one GOP of data within the time of one GOP. The output method need not consider the real time and should be determined at the design stage.

The recording rate adjuster 4 in FIG. 3 comprises the FIFO 41 and the counter 42.

The modulated compressed video signals, supplied from the output section 23 of the image compression encoder 2', are sequentially written, eight bits at a time, in the FIFO 41 in response to the write clock signal Wclk. As mentioned earlier, only the modulated compressed video signals corresponding to the produced compressed video signal are stored in the FIFO 41. Further, the data writing in the FIFO 41 is executed at the minimum rate of 131.072 Kbytes/GOP and at the maximum rate of 524.288 Kbytes/GOP due to the conversion (2048 to 4096) performed in the arithmetic operation unit 22. The FIFO 41 reads the modulated compressed video signals in the writing order as mentioned above, and transfers it to an LBR (Laser Beam Recorder) 3. The read operation of the FIFO 41 is carried out in response to a read clock Rclk supplied from a controller 5. At this time, the output of the FIFO 41 is defined as having one bit for the purpose of easier recording while the input has been made in eight bits each. In other words, while the video signals are stored in the units of eight bits in the FIFO 41, the video signals undergo parallel-to-serial conversion to become 1-bit serial output when it is read from the FIFO 41. Whether to output first the higher bits or lower bits should be determined at the design stage.

The counter 42 first counts the number of pulses of the write clock signal Wclk supplied from the output section 23 of the image compression encoder 2' and the number of pulses of the read clock signal Rclk supplied from the controller 5. Then, the counter 42 acquires the difference between the total amount of written data in the FIFO 41 and the amount of read data from a given point of time (normally, from the beginning of a sequence of image compressing processes), i.e., the residual capacity Res of the FIFO 41 to the entire memory capacity of the FIFO 41, based on those numbers of pulses, and supplies this data to the controller 5.

Residual capacity Res=Total number of Wclk—(Total number of Rclk ÷8)

The LBR 3 comprises a spindle system for rotating a recording glass master disk 300 to control the linear velocity, a slider system for moving the recording glass master disk 300 outward in the direction of the diameter from an inner track in proportion to the rotational linear velocity, and a semiconductor laser system for controlling a recording beam to form pits on the recording glass master disk 300.

The spindle system includes a table 310 on which the recording glass master disk 300 is placed, a spindle motor 311 for rotating the table 310, a rotary encoder 312 for generating a rotational pulse signal Spen corresponding to the rotation of the spindle motor 311 in responsive to the rotation of the rotary shaft of the spindle motor 311, and a spindle servo driver 313.

The semiconductor laser system includes a semiconductor laser driver 314, which generates a laser oscillation drive signal according both to the modulated compressed video signals supplied from the FIFO 41 and a laser power control signal Lpwr, and a semiconductor laser oscillator 315, which generates a recording laser beam according to this laser oscillation drive signal. The laser power of the recording laser beam matches with 100% of the recording linear velocity when the voltage of the laser power control signal Lpwr is 1 V, for example. This laser power is proportional to the laser power control signal Lpwr. Generally, the optimal recording laser power is proportional to the linear velocity.

The slider system includes a movable optical system 316 for focusing the recording laser beam on the recording glass master disk 300, a slide motor 317 for moving the movable optical system 316 in the radial direction of the recording glass master disk 300, a linear encoder 318 for generating a move pulse signal corresponding to the movement of the movable optical system 316, a slide servo driver 319 and a counter 320 which detects a radial recording position Rad.

The spindle servo driver 313 performs the servo control of the spindle motor 311 so as to match the pulse period of a spindle reference pulse signal Spdl with the pulse period of the rotational pulse signal Spen produced by the rotary encoder 312. The rotational pulse signal Spen generated by the rotary encoder 312 has 525 pulses per one rotation of the table 310.

The slide servo driver 319 performs the servo control of the slide motor 317 so as to match the pulse period of a slider reference pulse signal Sldr with the pulse period of the move pulse signal produced by the linear encoder 318. The move pulse signal produced by the linear encoder 318 has 6.6×10 pulses as the movable optical system 316 moves 1 μm.

The controller 5 comprises a DSP (Digital Signal Processor) 51 and a reference signal generator 52.

Based on the residual capacity Res from the counter 42 and the radial recording position Rad from the counter 320, the DSP 51 supplies various instruction signals to the reference signal generator 52 to control the speed of reading data from the FIFO 41 and the recording linear velocity of the LBR 3. The reference signal generator 52 generates the read clock signal Rclk having a frequency corresponding to the associated one of the various instruction signals and sends the clock signal Rclk to the FIFO 41 and the counter 42. The reference signal generator 52 generates the spindle reference pulse signal Spdl and slider reference pulse signal Sldr which have frequencies corresponding to the associated instruction signals from the DSP 51, and respectively sends those pulse signals to the spindle servo driver 313 and slider servo driver 319. Further, the reference signal generator 52 generates the laser power control signal Lpwr having a voltage value corresponding to the associated instruction signal from the DSP 51, and sends it to the semiconductor laser driver 314.

A description will now be given of the data read control of the FIFO 41 and the control on the recording linear velocity of the LBR 3 by the DSP 51, with reference to the operational flow given in FIG. 7.

Assume that the maximum recording linear velocity Lv of the LBR 3 is 2.3 (m/sec), the fixed track pitch Pch is $1.0 \times 10^{-6}$ (m) and the maximum read clock Rclkmax in the reference signal generator 52 is 8,388,608 (Hz).

The units (U) of the residual capacity Res of the FIFO 41 are set such that 5.24288 (Mbytes), the maximum amount of data stored in the FIFO 41 in five seconds, is defined as 100 (U). The control flow illustrated in FIG. 7 proceeds at the timing of the XOP synchronizing signal shown in FIG. 6; WX indicates the amount of data written in the FIFO 41 per XOP and RX indicates the amount of data read from the FIFO 41 per XOP.

Figure 7:
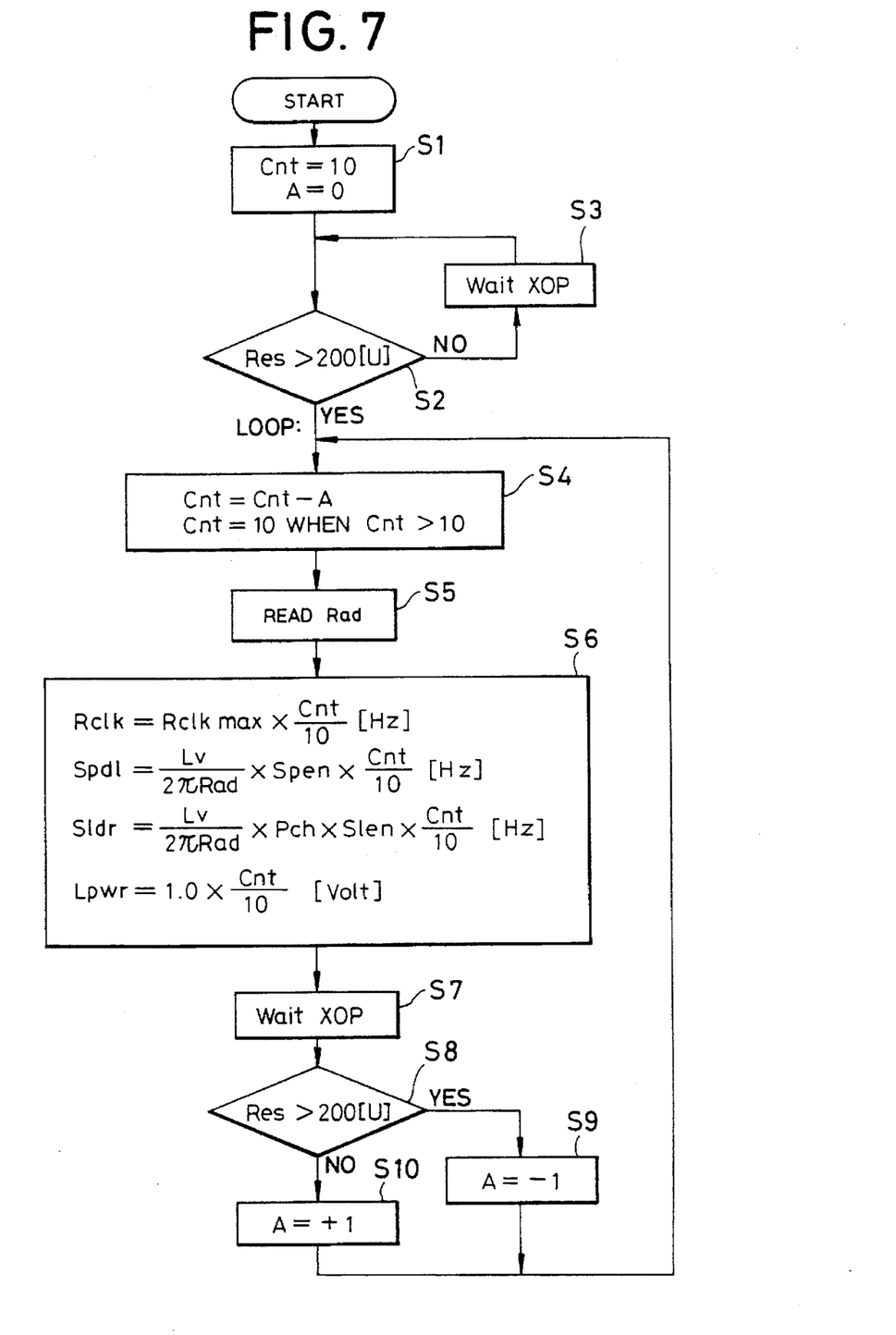
FIG. 7 is a diagram showing the operational flow in the compressed picture information recording apparatus of this invention.

In FIG. 7, when the image compression sequence by the image compression encoder 2' starts, the DSP 51 first sets recording rate control coefficients Cnt=10 and A=0 in internal registers (not shown), respectively (step S1). When the first modulated compressed video signal is input to the FIFO 41 at this point of time, the residual capacity Res of the FIFO 41 gradually increases from 0 (U), but the reading from the FIFO 41 is not carried out yet. Then, the DSP 51 reads the value of the residual capacity Res and determines if this value has exceeded 200 (U) (step S2). When it is not determined in step S2 that the residual capacity Res of FIFO 41 has exceeded 200 (U), the DSP 51 executes a waitXOP and then repeats the step S2 (step S3). The command waitXOP means that the DSP 51 waits for another XOP for five seconds at a maximum. When it is determined in step S2 that the residual capacity Res has exceeded 200 (U), on the other hand, the DSP 51 executes Cnt=Cnt-A. When Cnt becomes equal to or greater than "11" at this time, Cnt should forcibly be set to "10" (step S4). Next, the DSP 51 reads the current radial recording position Rad from the LBR 3 (step S5). The DSP 51 then performs the following calculations and supplies various instruction signals to make those settings to the reference signal generator 52 (step S6).

Rclk=(Rclkmax)·(Cnt/10)

Spdl=(Lv/2π·Rad)·(Spen)·(Cnt/10)

Sldr=(Lv/2π·Rad)·(Pch)·(Slen)·(Cnt/10)

Lpwr=1.0·(Cnt/10)

At this time, the reference signal generator 52 generates the signals Rclk, Spdl, Sldr and Lpwr according to the results of the calculations in step S6. Data reading from the FIFO 41 is performed in accordance with the signal Rclk obtained in step S6. The LBR 3 records the modulated compressed video signals, read from the FIFO 41, on the recording glass master disk 300 based on the signals Spdl, Sldr and Lpwr obtained in step S6.

Then, the DSP 51 executes the waitXOP and waits for the next control period (step S7) as in step S3. During this process, reading from the FIFO 41 and recording on the glass master disk 300 still continues, so that the residual capacity of the FIFO 41 gradually decreases until the transition to the next XOP. When XOP is switched, writing in the FIFO 41 is immediately carried out. Next, the DSP 51 reads the value of the residual capacity Res again and determines if this value has exceeded 200 (U) (step S8). When it is determined in step S8 that the residual capacity Res has exceeded 200 (U), the DSP 51 sets A=−1 (step S9). When it is not determined in step S8 that the residual capacity Res has exceeded 200 (U), on the other hand, the DSP 51 sets A=+1 (step S10). After the execution of step S9 or step S10, the DSP 51 returns to step S4 and repeats the above-described sequence of processes thereafter.

According to this control flow, as described above, it is determined for every XOP in step S8 if the residual capacity Res has exceeded 200 (U). When it is determined that the residual capacity Res has exceeded 200 (U), the DSP 51 executes a sequence of steps S9, S4, S5 and S6 to increase the data reading speed for the FIFO 41 and the recording linear velocity of the LBR 3. When it is determined that the residual capacity Res has not exceeded 200 (U) yet, on the other hand, the DSP 51 executes a sequence of steps S10, S4, S5 and S6 to decrease the data reading speed for the FIFO 41 and the recording linear velocity of the LBR 3. In other words, when the number of reading actions is greater than the number of writing actions and the residual capacity of the FIFO 41 falls below a predetermined value, the data reading speed for the FIFO 41 is reduced to increase the residual capacity of the FIFO 41. This control prevents the residual capacity of the FIFO 41 from becoming zero and always permits data reading from the FIFO 41 so that data recording on the glass master disk 300 can be performed continuously. When the residual capacity of the FIFO 41 becomes lower than the predetermined value, the data reading speed for the FIFO 41 should be reduced as mentioned above. In this case, however, the recording linear velocity of the LBR 3 is reduced in proportion to the data reading speed, so that nothing interferes with the formation of pits on the glass master disk 300.

Figure 8:
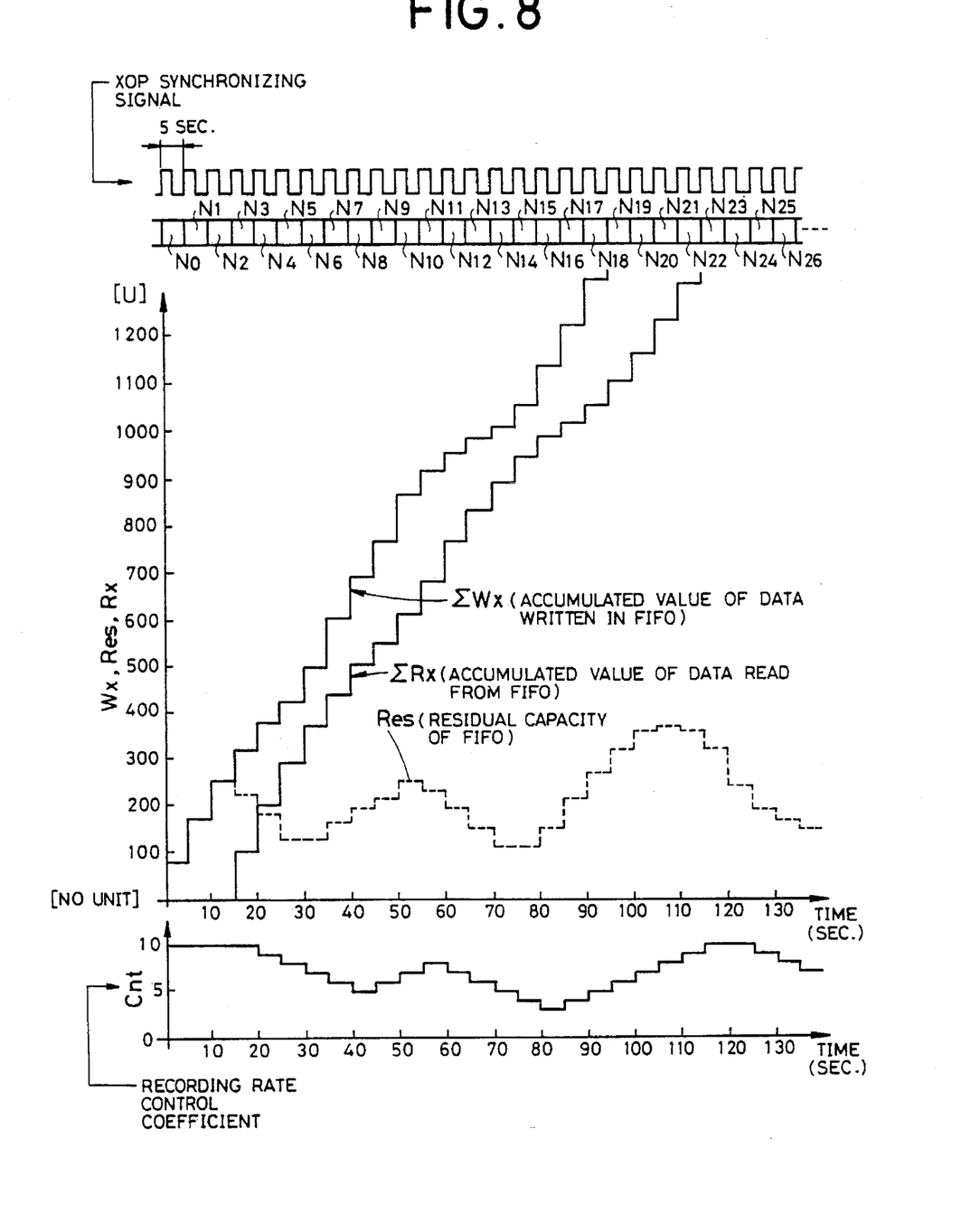
FIG. 8 is a diagram showing one example of a change in the remaining memory space in an FIFO (First In First Out) 41.

FIG. 8 shows one example of a change in the remaining memory space in the FIFO 41.

According to this embodiment, as described above, the recording apparatus, which is designed to compress and modulate video signals in real time and to record the resultant video signals as needed, temporarily stores the modulated compressed video signals in the FIFO 41 and performs speed control in such a manner that the reading speed to the FIFO 41 is reduced when the residual capacity of the FIFO 41 becomes smaller than the predetermined value and the reading speed to the FIFO 41 is increased when the residual capacity of the FIFO 41 becomes greater than the predetermined value, while the recording linear velocity of the LBR 3 for data recording on the recording glass master disk 300 is adjusted in accordance with the reading speed for the FIFO 41.

Even when the number of reading actions becomes greater than the number of writing actions, the residual capacity of the FIFO 41 does not become zero, thus permitting continuous data recording on the glass master disk 300.

Figure 9A:
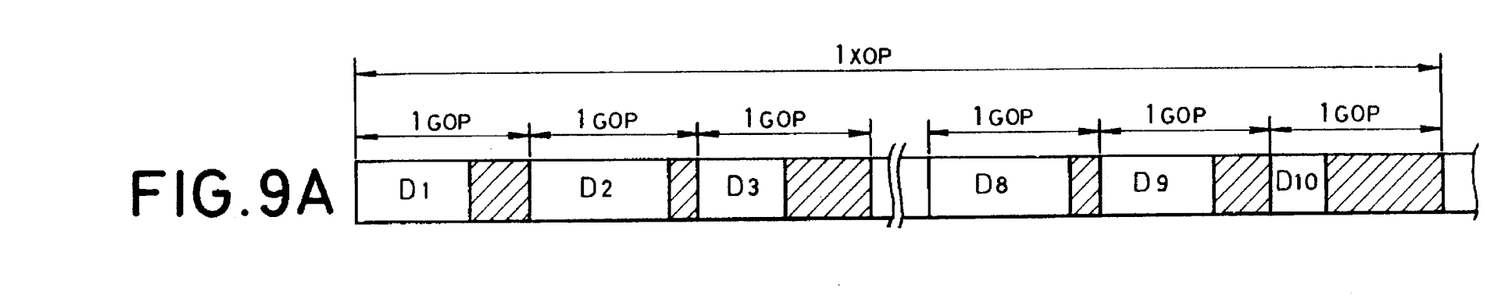
FIGS. 9A and 9B are diagrams for explaining the advantages of the compressed picture information recording apparatus of this invention.
Figure 9B:
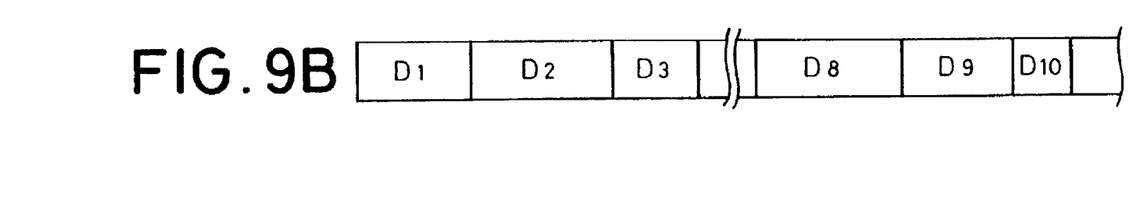

Therefore, the produced compressed video signals D1 to D10 excluding invalid data can be recorded on the glass master disk 300 as shown in FIG. 9B, thus improving the recording efficiency, as compared with the case where as shown in FIG. 9A, the prior art adds invalid data (shaded portion) to the produced compressed video signals (produced data D1–D10 in the diagram) to set the transfer rate constant and then records the signals.

In short, the compressed picture information recording apparatus of this invention first sequentially stores modulated compressed video signals, attained by compressing and modulating original video signals, in the memory. Information is read from this memory in such a manner that the information reading speed is reduced when the residual capacity of the memory becomes smaller than a predetermined value, whereas the information reading speed is increased when the residual capacity of the memory becomes greater than the predetermined value. Then, the signals read from this memory are recorded on a recording disk at the recording linear velocity corresponding to the information reading speed.

This invention therefore permits compressed video signals excluding invalid data to be continuously recorded on the recording disk at a variable transfer rate according to the producing rate of the compressed video signals produced, thus desirably improving the recording efficiency.

What is claimed is:

1. A compressed picture information recording apparatus for performing digital compression coding on a video signal and recording the coded video signal on a recording disk, continuously in real time, said apparatus comprising:

an image compression encoder sequentially outputting a modulated compressed video signal obtained by compressing and modulating said video signal;

a memory;

write/read means for sequentially storing said modulated compressed video signal in said memory and reading said modulated compressed video signal from said memory in a storing order in accordance with a read clock signal;

recording means for recording said modulated compressed video signal, read from said memory, on said recording disk;

residual data amount detecting means for detecting an amount of residual data in said memory; and a controller for reducing a frequency of said read clock signal when said amount of residual data is smaller than a predetermined value, increasing said frequency of said read clock signal when said amount of residual data is greater than said predetermined value, and adjusting a linear recording velocity of said recording means in accordance with adjustment of said frequency of said read clock signal.

2. The apparatus according to claim 1 herein said memory is a FIFO (First In First Out) type.

3. The apparatus according to claim 1, wherein said residual data amount detecting means detects said amount of residual data based on a difference between a number of pulses of a write clock signal supplied to said memory and a number of pulses of said read clock signal.

* * * * *